US012214636B2

(12) United States Patent
Minino et al.

(10) Patent No.: US 12,214,636 B2
(45) Date of Patent: Feb. 4, 2025

(54) AMPHIBIOUS VEHICLE

(71) Applicant: BAZOOKA-FARMSTAR, LLC, Washington, IA (US)

(72) Inventors: Phillip Minino, Washington, IA (US); Jeffery Huber, Wellman, IA (US); Matthew Hirsch, Washington, IA (US); Jason Albright, Wellman, IA (US)

(73) Assignee: BAZOOKA-FARMSTAR, LLC, Washington, IA (US)

( * ) Notice: Subject to any disclaimer, the term of this patent is extended or adjusted under 35 U.S.C. 154(b) by 0 days.

(21) Appl. No.: 18/520,069

(22) Filed: Nov. 27, 2023

(65) Prior Publication Data
US 2024/0100896 A1 Mar. 28, 2024

Related U.S. Application Data

(63) Continuation of application No. 17/351,841, filed on Jun. 18, 2021, now Pat. No. 11,865,885.
(Continued)

(51) Int. Cl.
*B63H 1/14* (2006.01)
*B60F 3/00* (2006.01)
*B63H 21/165* (2006.01)
*B63H 25/42* (2006.01)
*G05D 1/00* (2024.01)
*G05D 1/222* (2024.01)
*G05D 1/227* (2024.01)

(52) U.S. Cl.
CPC .......... *B60F 3/0038* (2013.01); *B63H 1/14* (2013.01); *B63H 21/165* (2013.01); *B63H 25/42* (2013.01); *G05D 1/0011* (2013.01); *G05D 1/0088* (2013.01); *G05D 1/222* (2024.01); *G05D 1/227* (2024.01)

(58) Field of Classification Search
CPC ....... B60F 3/0038; B63H 1/14; B63H 21/165; B63H 25/42; G05D 1/0011; G05D 1/0088
See application file for complete search history.

(56) References Cited

U.S. PATENT DOCUMENTS

| 613,809 A | 11/1898 | Tesla |
| 2,625,110 A | 1/1953 | Haentjens et al. |

(Continued)

FOREIGN PATENT DOCUMENTS

| CN | 101164828 A * | 4/2008 |
| CN | 202715247 U | 2/2013 |

(Continued)

OTHER PUBLICATIONS

Fisher Pumps, "Features of Typical Belt Drive Fisher Pump", 2002, 2 pages.

(Continued)

*Primary Examiner* — Anthony D Wiest
(74) *Attorney, Agent, or Firm* — Merchant & Gould P.C.

(57) ABSTRACT

An amphibious vehicle having a frame that includes a plurality of floatable members. Mounted to the frame is one or more power sources. Also mounted to the frame and connected to the power source are a plurality of propellers with each of the plurality of propellers having a thrust vector configured to be adjusted to provide agitation and propulsion. In addition, mounted to the frame are a plurality of ground engaging devices and one or more pumps.

12 Claims, 7 Drawing Sheets

Related U.S. Application Data

(60) Provisional application No. 63/104,887, filed on Oct. 23, 2020, provisional application No. 63/040,562, filed on Jun. 18, 2020.

(56) References Cited

U.S. PATENT DOCUMENTS

| | | | |
|---|---|---|---|
| 2,890,659 | A | 6/1959 | Haentjens et al. |
| 3,199,486 | A | 8/1965 | Gillois et al. |
| 3,256,950 | A | 6/1966 | De Biasi |
| 3,367,583 | A | 2/1968 | Kellogg |
| 3,384,047 | A | 5/1968 | Remley |
| 3,385,255 | A | 5/1968 | Raymond et al. |
| 3,444,837 | A | 5/1969 | Donofrio |
| 3,664,451 | A | 5/1972 | Rogers et al. |
| 3,733,151 | A | 5/1973 | Timmons et al. |
| 4,063,849 | A | 12/1977 | Modianos |
| 4,270,307 | A | 6/1981 | Arigaya |
| 4,545,315 | A | 10/1985 | Becherer |
| 4,664,051 | A | 5/1987 | Newkirk |
| 4,699,597 | A | 10/1987 | Oja |
| 4,744,324 | A | 5/1988 | Martinmaas |
| 5,100,303 | A | 3/1992 | Depault |
| 5,176,098 | A | 1/1993 | Royle |
| 5,690,046 | A | 11/1997 | Grzech, Jr. |
| 5,993,273 | A | 11/1999 | Adams |
| 6,482,052 | B1 | 11/2002 | Glijam |
| 6,666,735 | B2 | 12/2003 | Benoit |
| 6,672,916 | B1 | 1/2004 | Lent-Phillips et al. |
| 6,798,336 | B2 | 9/2004 | Kanda et al. |
| 6,808,430 | B1 | 10/2004 | March |
| 6,922,922 | B2 | 8/2005 | Cheramie |
| 7,032,698 | B2 | 4/2006 | Lee et al. |
| 7,159,889 | B2 | 1/2007 | Nuhn et al. |
| 7,314,395 | B2 | 1/2008 | Bryham |
| 7,478,817 | B1 | 1/2009 | Carrier |
| 7,747,817 | B2 | 6/2010 | Norman |
| 7,797,789 | B2 | 9/2010 | Nuhn |
| 7,833,071 | B2 | 11/2010 | Gaither |
| 8,301,318 | B2 | 10/2012 | Lacaze et al. |
| 8,543,256 | B1 | 9/2013 | Karafiath |
| 8,899,165 | B2 | 12/2014 | Puck |
| 8,944,758 | B2 | 2/2015 | Nuhn |
| 9,462,741 | B2 | 10/2016 | Puck |
| 9,572,297 | B2 | 2/2017 | Puck |
| 9,694,636 | B2 | 7/2017 | Nuhn |
| 9,931,899 | B2 | 4/2018 | Coast |
| 10,118,138 | B2 | 11/2018 | Tews |
| 10,124,638 | B2 | 11/2018 | Nuhn |
| 10,212,879 | B2 | 2/2019 | Nuhn |
| 10,694,661 | B2 | 6/2020 | Nuhn |
| 10,710,422 | B2 | 7/2020 | Nuhn |
| 10,974,557 | B2 | 4/2021 | Nuhn |
| 11,358,425 | B1 | 6/2022 | Nuhn |
| 11,499,665 | B2 | 11/2022 | Marvi et al. |
| 2002/0112460 | A1 | 8/2002 | Penny |
| 2005/0124234 | A1 | 6/2005 | Sells |
| 2010/0005857 | A1* | 1/2010 | Zhang .................. G01C 13/00 73/29.02 |
| 2012/0185129 | A1 | 7/2012 | Carrier |
| 2012/0263014 | A1 | 10/2012 | Von Briel |
| 2013/0033070 | A1 | 2/2013 | Kinsman et al. |
| 2014/0112093 | A1 | 4/2014 | Puck |
| 2014/0288763 | A1 | 9/2014 | Bennett et al. |
| 2015/0258868 | A1 | 9/2015 | Visscher |
| 2020/0290415 | A1 | 9/2020 | Nuhn |
| 2021/0331752 | A1 | 10/2021 | Bennett et al. |
| 2023/0278056 | A1 | 9/2023 | Puck et al. |

FOREIGN PATENT DOCUMENTS

| | | |
|---|---|---|
| DE | 19527977 A1 | 12/1996 |
| EP | 325091 A1 | 7/1989 |
| GB | 2 366 218 A | 6/2002 |
| GB | 2366218 B | 5/2004 |
| GB | 2401829 A | 11/2004 |
| JP | 2001037903 A | 2/2001 |
| KR | 1020130016490 A | 2/2013 |
| RU | 131 561 U1 | 8/2013 |
| WO | 2008038029 A2 | 4/2008 |
| WO | WO-2012127424 A1 * | 9/2012 .......... A01K 61/007 |

OTHER PUBLICATIONS

Fisher Pumps, Owner's Manual, Sep. 1, 2007, 7 pages.
Conver Machines, "Conver C550 Compact Amphibious Excavator," https://www.youtube.com/watch?v=f5ykTlsYTAK, Feb. 1, 2012, 2 pages.
Annex Publishing & Printing Inc., "Manure Manager, Sep./Oct. 2009," 40 pages.
Nuhn Industries, Ltd., Dual Port Header Series Pump Brochure, prior art as of Mar. 2010, 1 page.
Nuhn Industries, Ltd. Dual Port Header Series Pump website, Jun. 5, 2011, 11 pages.
Schroer Environment and Water Technology GMBH & CO, "Light Amphibious Boat/Vehicle, Amphi-King®" SWT-AB380, Aug. 19, 2013, 3 pages.
Ud Umwelt-Dienste GMBH, "Partner der Kommunen—Verwertung," Apr. 8, 2011, 4 pages.
Биоком Технология, "Земснаряд Senwatec," https://www.youtube.com/watch?v=ecnlfMf7CH4, 2017.
Dorotea Mekaniska Ab, Truxor, Amphibian tool carrier, prior art as of Aug. 19, 2013, 16 pages.
Dorotea Mekaniska Ab, Truxor, Amphibian tool carrier, copyright 2013, 20 pages.
Dorotea Mekaniska Ab, Truxor, Amphibian tool carrier, prior art as of Aug. 19, 2013, 20 pages.
HNA, "The Frog as a model," Aug. 25, 2011, 7 pages.
Husky Farm Equipment Limited, "Husky Liquid Manure Pump H5000/H6000 Operator's Manual," Apr. 1995, 28 pages.
Husky Farm Equipment Limited, "Liquid Manure is an Asset, Not a Waste, Treat It as Such," Sep. 11, 1985, 2 pages.
Husky Farm Equipment Limited, "Husky Liquid Manure HC5000 Pump Parts Manual," Apr. 28, 1982. 4 pages.
Main-Post GHBH, "Agitated Sewage Slurry," Oct. 15, 2010. 2 pages.
Annex Publishing & Printing Inc., "Manure Manager, Creative manure management," Jan./Feb. 2011, 32 pages.
Sundstrom, Ernie, "Stir dredge," https://www.youtube.com/watch?v=RDyAyLgMETY, Apr. 13, 2012, 2 pages.
Dvanheel70, "Shi-toon," https://www.youtube.com/watch?v=H0YTCFe8WG8, Apr. 16, 2012, 2 pages.
Kilsdonk, Curt "Manure agitation barge 1," https://www.youtube.com/watch?v=IM74_B6XR9U, Jan. 14, 2013, 2 pages.
Shopseventhavenue, "Remote Control Amphibious Tank," https://www.youtube.com/watch?v=daZ2s_NaYr4, Jul. 26, 2011, 2 pages.
Progressive Dairy, "Equipment demonstrations: Manure agitation boats," https://www.youtube.com/watch?v=FXRS-9lp1pE, Jul. 9, 2014, 2 pages.
WaterCar EV, "WaterCar EV—Fun Day Cruising!," https://www.watercar.com/, copyright 2024, 5 pages.
WaterCar Amphibious Vehicle Manufacturer, "WaterCar Amphibious Fire Rescue Vehicle!", https://www.youtube.com/watch?v=8BEdVqFw_Vg, Jun. 12, 2017, 2 pages.
Godwinpumps, "Godwin Pump Amphibious Vehicle," https://www.youtube.com/watch?v=NhjWCZD8UT8, Nov. 3, 2015, 2 pages.
Weedoo Greenboat Inc., AmphiKing Model 6450, https://www.weedooboats.com/wp-content/uploads/2019/03/Weedoo_amphi2-1024x768.jpeg, copyright 2024, 1 page.
Weedoo Greenboat Inc., "Photo Gallery," https://www.weedooboats.com/gallery/, copyright 2024, 5 pages.
Botsman Amphibiy, "Земснаряд, плавающий экскаватор, амфибия "Botsman M". Очистка Водоема, дноуглубление, добыча,dredger,"https://www.youtube.com/watch?v=l2FERYGSFWw, May 3, 2019, 2 pages.
Eddypump Corporation, "Our Products," https://eddypump.com/products, copyright 1984-2024, 13 pages.

(56) References Cited

OTHER PUBLICATIONS

Botsman Amphibiy, "Земсчаряд экскаbatop "Боцмаh 160"Dredger. Добыча, очистка, углубление," https://www.youtube.com/watch?v=gdzN7GFCPdw, Jul. 3, 2018, 2 pages.
Botsman, "Dredgers Floating excavators Amphibians," https://www.boatswain.org/, printed 2024, 6 pages.
Annex Publishing & Printing Inc., Manure Manager, "Manure Turnover: Nebraska dairy develops composting enterprise," Jul./Aug. 2011, 32 pages.
Kaschik, "Der Frosch als Vorbild," HNA, https://www.hna.de/lokales/rotenburg-bebra/frosch-vorbild-1376974.html, 9 pages (Aug. 25, 2011).
Lyseng, "Float your boat in a slurry moat," The Western Producer, 3 pages (Aug. 29, 2013).
Screenshots from UD Umwelt-Dienste GmbH Amphi-King Manure Pumping Video, 5 pages.
SenwaTec-Schröer Umwelt-& Gewässertechnologie Gmbh & Co. KG, Light Amphibious Boat/Vehicle "Amphi-King®" SWT--AB380 (SenwaTec), 3 pages.
Truxor Amphibian Tool Carrier, Dorotea Mekaniska AB, (Truxor), 16 pages.
Truxor Amphibian Tool Carrier, Dorotea Mekaniska AB, (Truxor-II), 20 pages (2013).
Truxor Amphibian Tool Carrier, Dorotea Mekaniska AB, (Truxor-III), 20 pages (2013).
Truxor Amphibian Tool Carrier, Dorotea Mekaniska AB, (Truxor-IV), 20 pages.
JP2001037903-English Translation.
CN202715247U-English Translation.
DE19527977A1-English Translation.
Integrity Sales & Auction, "19079—Manure Agitator Boat & Parts Will Be Sold At Auction!", https://www.youtube.com/watch?v=jnFKoq67pzQ, Oct. 7, 2022, 1 page.
Snapshotxx, "Sundstrom Pit Pumping stir boat", https://www.youtube.com/watch?v=tTtFx1AUQi0, Mar. 12, 2013, 1 page.
Annex Publishing and Printing Inc., "Manure Manager", Sep./Oct. 2014, vol. 12, No. 5, 48 pages.
J. Houle & Fils Inc., "Pumps and valves for flush system", Jan. 2001, 8 pages.
J. Houle & Fils Inc., "Manure pumps and agitators", 2002, 7 pages.
Puck Enterprises, "Agitation Boats," https://puck.com/product/agitation-boats/, copyright 2024, 9 pages.
Puck Enterprises, "Agitation Boats," https://web.archive.org/web/20221003142631/https:/puck.com/product/agitation-boats/#expand, copyright 2022, 15 pages.
JT Manure Agitators, "JT Manure Agitator Boat" Features & Advantages, https://www.manureagitators.com/manure-agitator-features/, copyright 2020, 8 pages.
JT Manure Agitators, "JT Manure Agitator Boat" Features & Advantages, https://web.archive.org/web/20200811042938/https:/www.manureagitators.com/manure-agitator-features/#expand, copyright 2020, 10 pages.
JT Boats LLC, "GPS Feature on a JT Manure Agitator Boat," https://www.youtube.com/watch?v=yrDXoSgrjS8, May 5, 2020, 2 pages.
JT Boats LLC, "GPS on a JT Manure Agitator Boat 1800 Series out of a lagoon," https://www.youtube.com/watch?v=GrJjbLMNy34, May 5, 2020, 2 pages.
JT Boats LLC, "Drone Footage of a JT Manure Agitator Boat 1800 Series," https://www.youtube.com/watch?v=nl2JzSHadOo, May 5, 2020, 2 pages.

\* cited by examiner

AMPHIBIOUS VEHICLE

CROSS REFERENCE TO RELATED APPLICATION

This application claims the benefit of the priority of U.S. Provisional Application No. 63/040,562 filed on Jun. 18, 2020 and U.S. Provisional Application No. 63/104,887 filed on Oct. 23, 2020, the contents of these applications are hereby incorporated by reference in their entirety.

BACKGROUND OF THE INVENTION

The present invention is directed to an amphibious vehicle and more particularly an amphibious vehicle having one or more propellers for agitation, propulsion, and steering.

Standing ponds or lagoons are used for holding or containing both solid and liquid materials. Both natural occurring and man-made lagoons may need to be treated or otherwise utilized. For example, natural ponds may need vegetation treated or physical removal and man-made lagoons may need to be stirred in order to facilitate removal of the material in the lagoon. In one situation, manure lagoons need to be agitated in order to facilitate removal of manure slurry, which can then be applied as part of growing crops. Machines used for these activities include boats, bottom crawlers, and combination machines that both float and ride on the bottom of the lagoon. Agitation is usually accomplished through recirculating liquid from the lagoon or through propellers. Recirculating liquid agitation rely on pumping liquid through nozzles directed into or through the lagoon. Propellers at the surface and under the surface may be another source of agitation.

Existing solutions have several shortcomings. Most existing units use submerged centrifugal pumps driven from an engine/gearbox drivetrain, that then pump the slurry through piping and nozzles which are opened and closed to steer the boat with a vast network of hydraulic valving and controls. The main problem with this type of solution is the wear and tear (and thus reliability) of the unit since every gallon used for power and mixing has to flow through a single pump. Use of very high velocity and, in some solutions, high pressures to do this, which is cause for excess and premature wear when pumping hard sand mixtures. The network of hydraulic valves and piping gate valves are complex (e.g. many moving components) that are difficult to maintain and become unreliable after even short term use.

Other solutions use high pressure/high velocity nozzles to mix solids and nutrients. The high velocity and relatively low volume of liquid have very high energy dissipation when contacting the main body of water/liquid manure. They lack the ability to agitate deep lagoons. They also use these nozzles to steer the vehicle when floating. Use of a single power source to provide both agitation and propulsion also makes it difficult to do either. If agitation is sufficient then it is difficult to hold the platform steady. Conversely, if the propulsion system holds the platform steady, then the agitation is insufficient.

Thus, known solutions fail to provide adequate agitation, maneuverability of the machine, or have other failings, such as cost.

An objective of the present invention is to provide an amphibious vehicle that provides adequate agitation.

Another objective of the present invention is to provide an amphibious vehicle with improved maneuverability.

A still further objective of the present invention is to provide an amphibious vehicle having fewer parts requires less maintenance and lowers the cost of ownership.

These and other objectives will be apparent to those having ordinary skill in the art based upon the following written description, drawings and claims.

SUMMARY OF THE INVENTION

An amphibious vehicle includes a frame having one or more floatable members. Mounted to the frame is one or more power sources. Also, one or more propellers are mounted to the frame and connected to the power source such that each of the one or more propellers have a thrust vector configured to provide agitation and/or propulsion. In addition one or more ground engaging devices and one or more pumps are connected to the frame.

The one or more propellers are mounted to the frame in a manner that allows the thrust vector of each propeller to be adjusted, in real time, both continuously and intermittently. The thrust vectors of each propeller are adjusted both individually and in groups. In one example the propellers are attached to the frame with a joint and are also connected to an actuator. In another example the propellers are connected to the frame with an arm that is adjustable in length.

The vehicle and its components are controlled and operated with a control unit. As an example, with respect to the propellers, the control unit controls the direction of rotation, the speed of rotation, and the position of each thrust vector.

The vehicle also has in one embodiment at least one nozzle, or alternatively a conduit with an output port, that are connected to the pump. An adjustable deflector device could be used in relation to the nozzle, output port, and/or propellers to affect thrust vectors. Also, the vehicle and its component parts are operated either autonomously with the control unit or through a remote control system.

DETAILED DESCRIPTION

Figure 1:
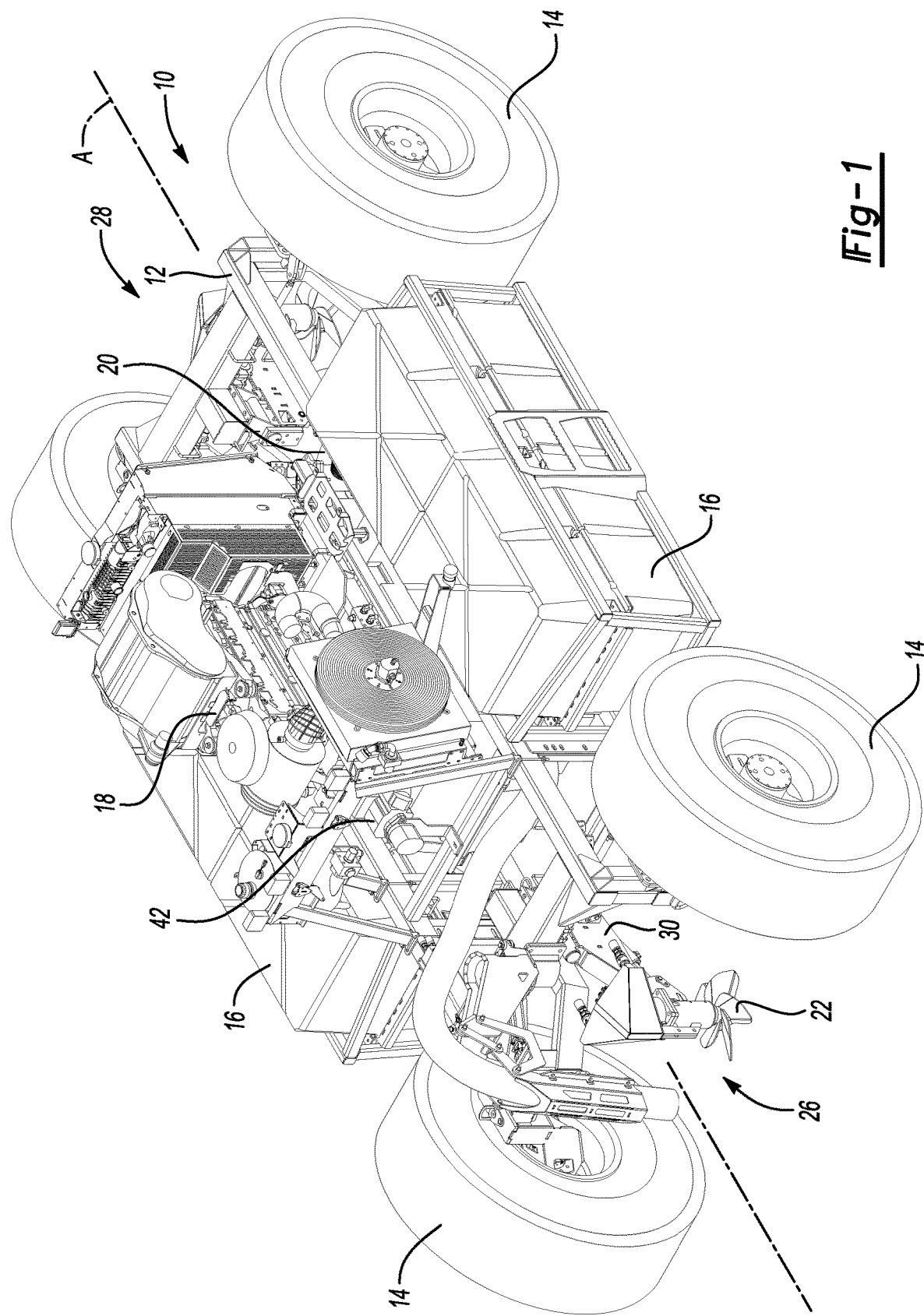
FIG. 1 is a perspective view of an amphibious vehicle.
Figure 2:
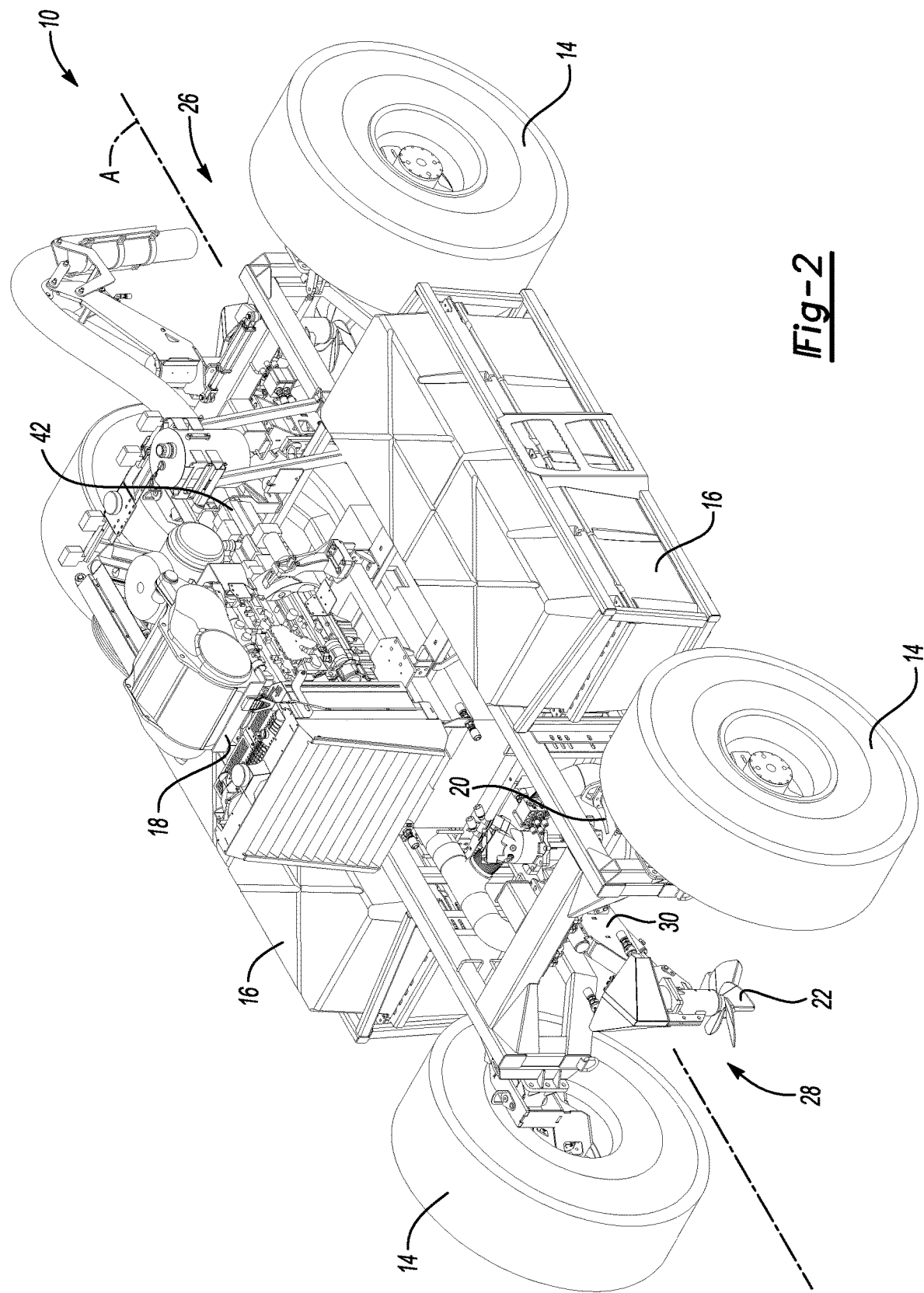
FIG. 2 is a perspective view of an amphibious vehicle.
Figure 3:
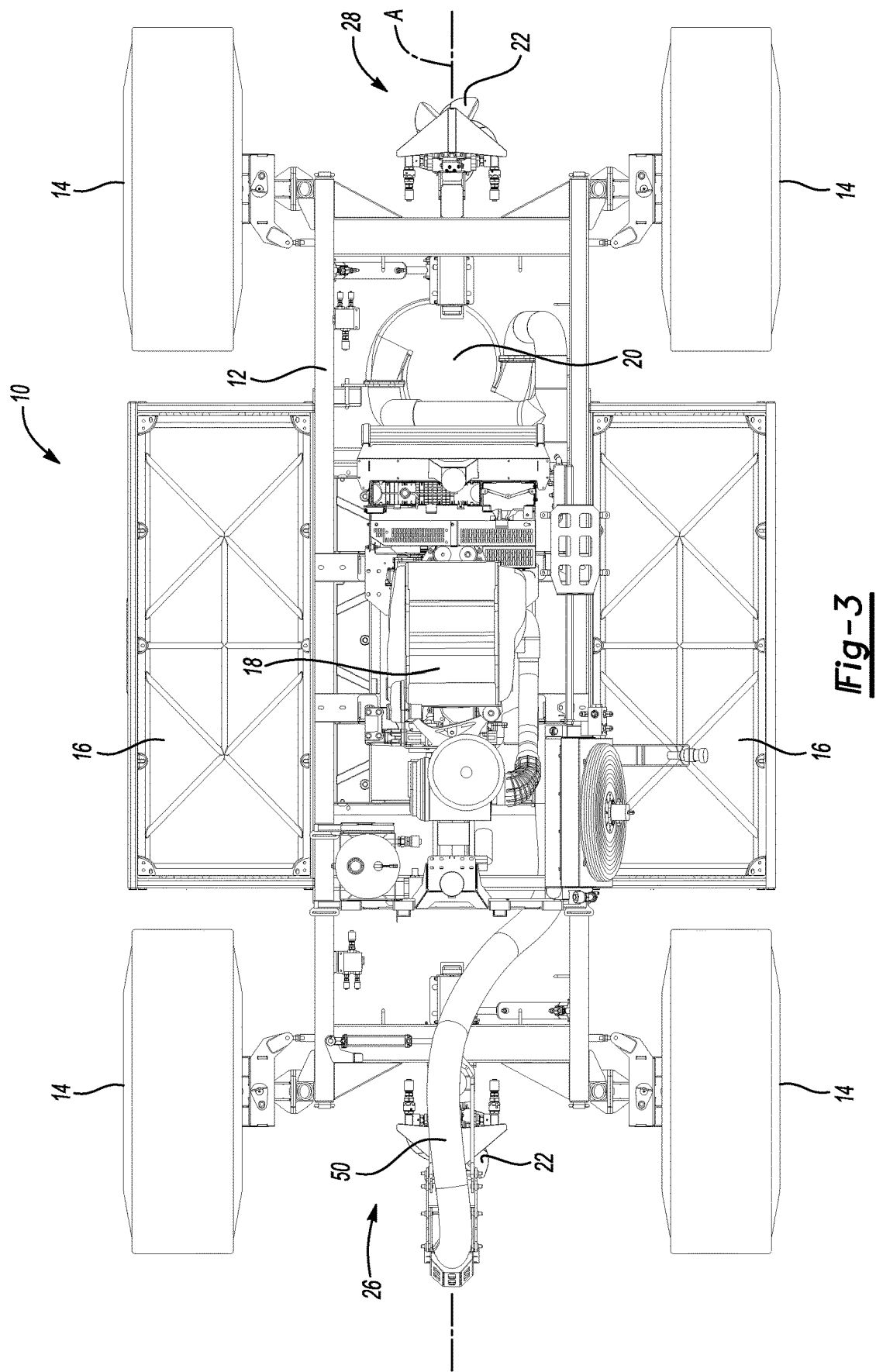
FIG. 3 is a top plan view of an amphibious vehicle.
Figure 4:
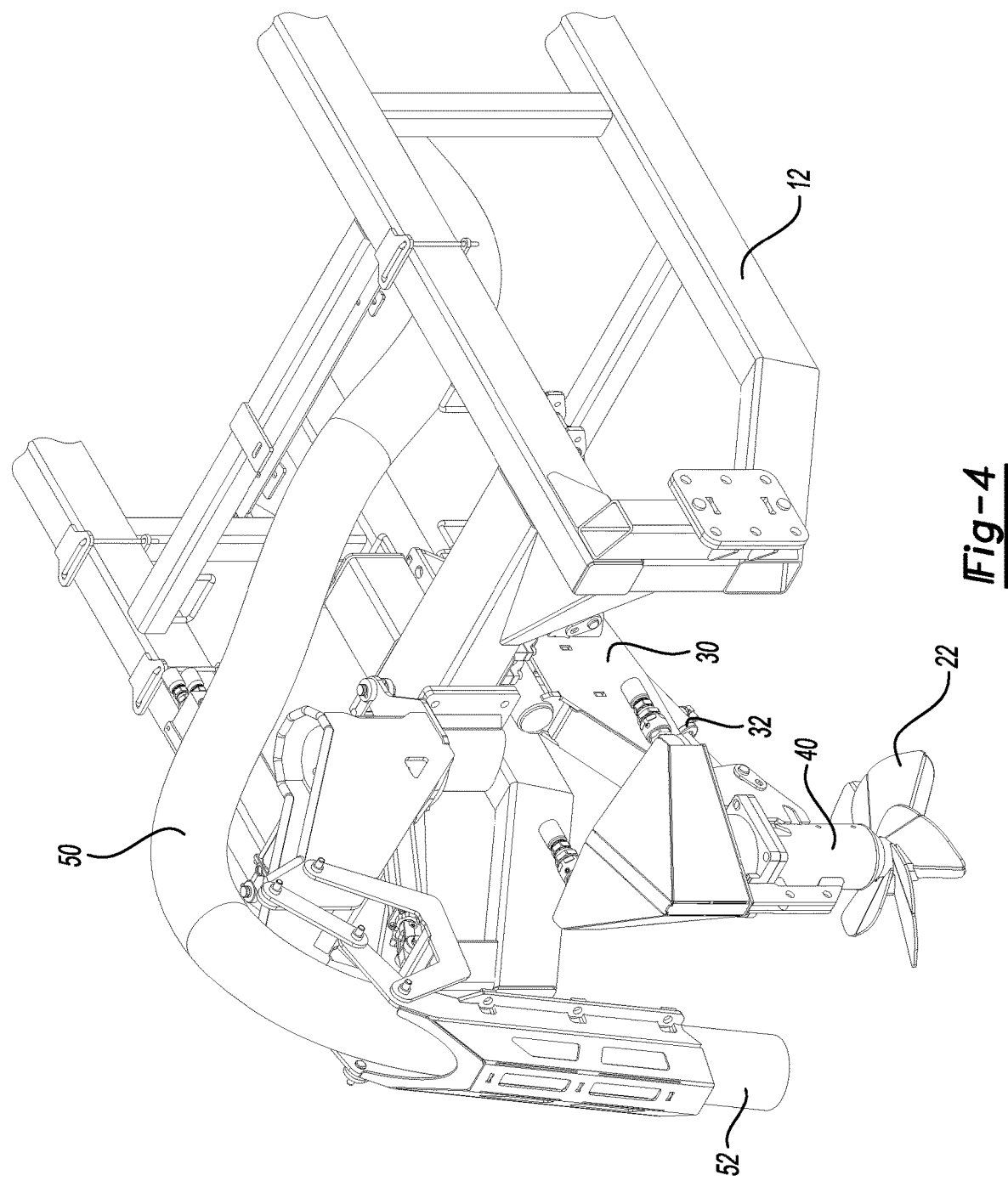
FIG. 4 is a perspective view of a portion of an amphibious vehicle.
Figure 5:
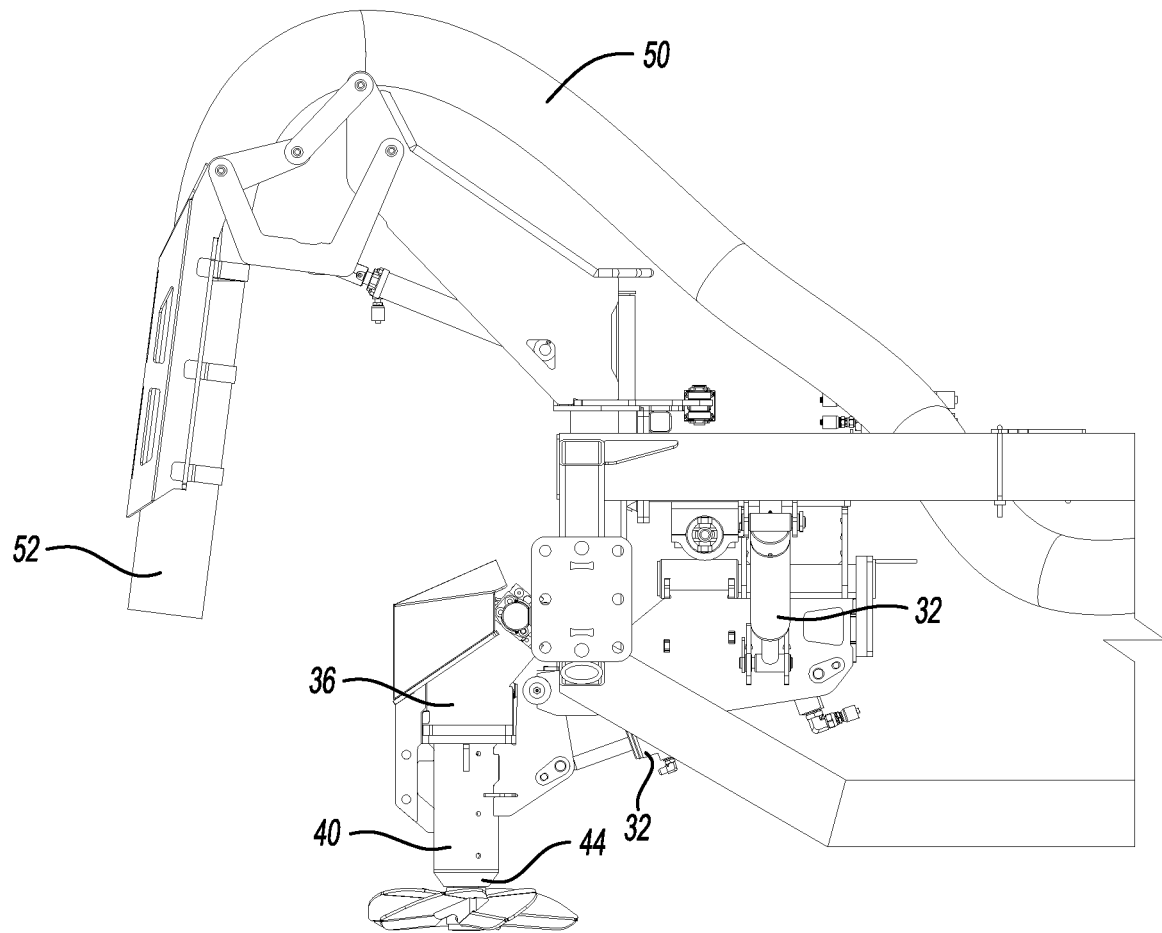
FIG. 5 is a side view of a portion of an amphibious vehicle.
Figure 6:
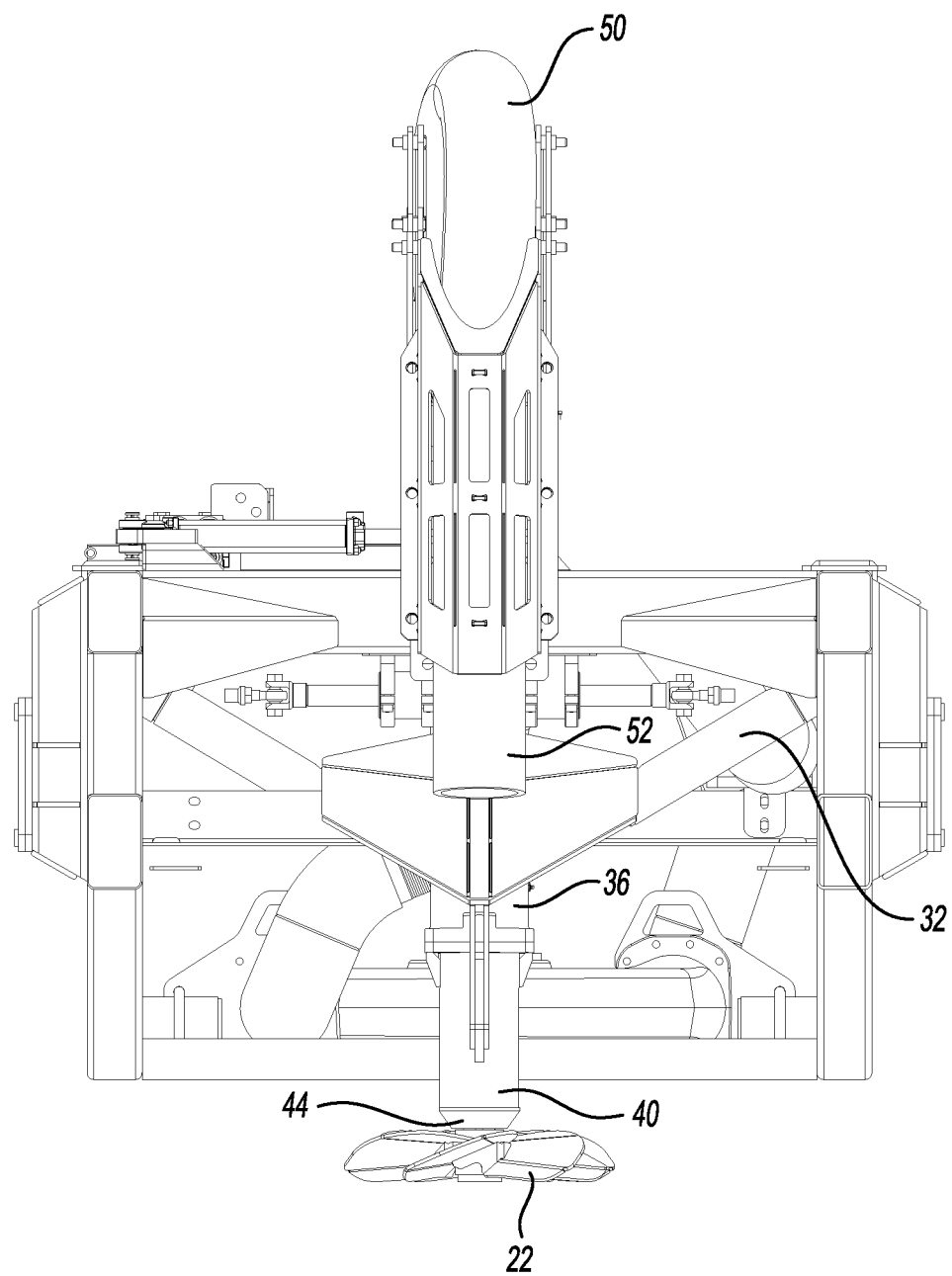
FIG. 6 is a front view of an amphibious vehicle.
Figure 7:
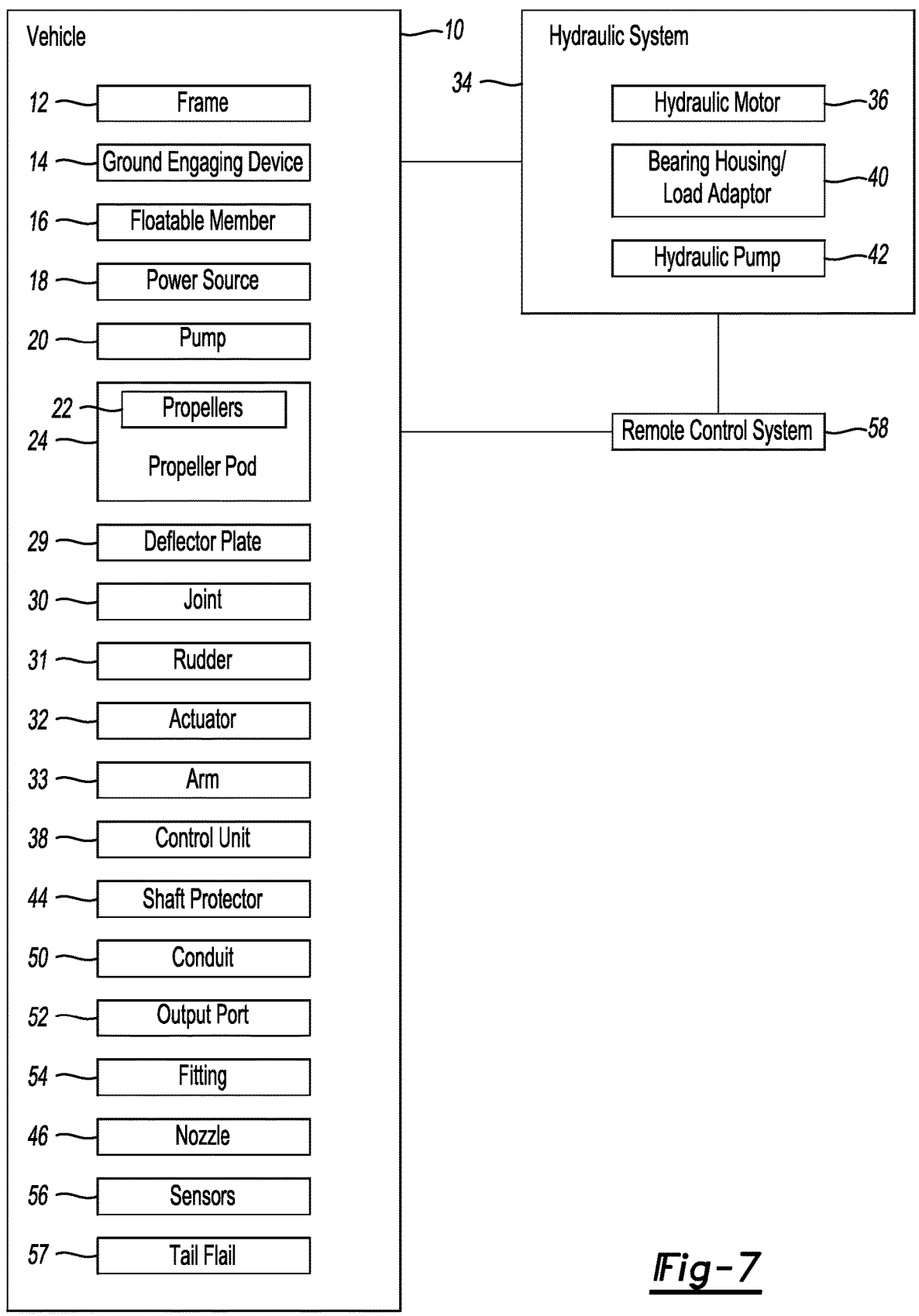
FIG. 7 is a schematic view of an amphibious vehicle.

Referring to the figures, an amphibious vehicle 10 includes a platform or frame 12 to which one or more ground engaging devices 14 such as wheels, a track, or the like are operably connected. Encompassed or disposed with in the frame 12 is one or more buoyant or floatable members 16. Mounted to the frame 12 is one or more power sources 18 which are of any type such as a drive or combustion engine or motor, or one or more batteries. Also mounted to the frame 12 is one or more pumps 20, and preferably two or less, configured to pump liquid. The pumps 20 are of any type and include centrifugal pumps and may have one or more outlets, and preferably two or less, connecting to conduits. The pumps also preferably are submersible, but may also be non-submersible and may be reversible to draw liquid in as well as expel liquid. The power source 18 is configured to provide power to both the ground engaging devices 14, the one or more pumps 20, and the one or more propellers 22. The power is provided in any manner such as mechanically, hydraulically, electrically, or the like.

Also mounted to the frame 12 are one or more propellers 22, or propeller pods 24 that comprise more than one propeller. The propellers 22 are connected to the frame 12 either directly or indirectly and in one example one or a pair of propellers 22 are connected to the front 26 of the frame 12 and one or a pair of propellers 22 are connected to the rear 28 of the frame 12. In addition, the propellers 22 are positioned along a central axis A or each pair of propellers 22 are positioned on each side of a central axis A that runs the length of the frame 12. The pair of propellers 22 are further positioned in relation to one another to allow for agitation of a pond or lagoon to occur without the propellers interfering with one another and are located such that when the vehicle is deployed into a lagoon the propellers are positioned below the surface of the lagoon which helps to prevent problems with ventilation during operation of the propellers. Each propeller 22 has a thrust vector.

The propellers 22 are connected to the frame 12 in a manner that allows the thrust vector of each propeller to be adjusted, preferably in real time, when the vehicle 10 is located in the lagoon. The thrust vectors can also be adjusted continuously or on an intermittent basis so as to provide different types of agitation, steering, and/or propulsion. For example, each propeller 22 would have a thrust vector based on position that is generally vertical, horizontal (side to side or front to rear), or angled at some position that is a combination of vertical and horizontal. In one example one or more thrust vectors are pointed upward toward the surface of the lagoon to cause agitation at the surface. In another example individual propellers 22 are held steady while the thrust vectors of other propellers 22 are adjusted. While the thrust vector of one propeller 22 is held steady, thrust can be deflected through use of a one or more fixed or moveable deflector devices 29 such as a plate, a ring, or the like to assist in steering the vehicle 10. Also, one or more rudders 31 are used to steer or assist in steering the vehicle 10.

In addition, the thrust vectors of each propeller 22 are adjustable either individually or in groups as is the speed of rotation of each propeller 22. In one example the propellers 22 are attached to the frame 12 with a joint 30 and are also connected to an actuator 32. The joint 30 provides many degrees of freedom of movement for the propeller 22 and the actuator 32 is configured to move the propeller 22 to change the propeller's 22 thrust vector. The actuator 32 is of any type including but not limited to a hydraulic cylinder driven mechanism, hydraulic rotary actuators, or the like. Also, the actuators 32 are powered by the power source 18. In another example, the propellers 22 are connected to the frame 12 with an arm 33 that is adjustable in length to permit the depth of the propeller 22 to be changed as desired.

The propellers 22 are driven by the power source 18 and are preferably driven by a hydraulic system 34 having at least one hydraulic pump 42 and hydraulic motor 36. The hydraulic pumps 42, in addition to providing power to the propellers 22, can also be used to drive the ground engaging devices 14. Alternatively, the propellers 22 are mechanically or electrically driven by the power source 18. In addition to providing agitation, the propellers 22 are also configured to provide propulsion to the vehicle 10 when the vehicle 10 is in the lagoon (e.g. floating).

The propellers 22 are connected to and controlled by one or more control units 38 that send and/or relay instructions to the power source 18, motors 36, actuators 32, and propellers 22 regarding the direction of rotation, speed of rotation and the position of the thrust vectors of the propellers 22. In addition, both the direction of rotation of each propeller 22 the speed of rotation of each propeller 22, and the position of the thrust vector of each propeller 22 is controlled individually and in groups. For example, a front left propeller 22 is operated alone, or alternatively both the left front and the left rear propellers 22 are operated as part of a group. Having the ability to selectively control the propellers 22 provides for both fine and gross control of the propulsion and/or agitation through the propellers 22. In another example all operating parameters of each propeller 22 are controlled individually or in a group such as when the left front propeller 22 is positioned to provide a downward thrust vector at a first speed while the left rear propeller is positioned to provide an upward thrust vector at a second speed. Also, rather than using propellers 22 in each corner of the frame 12 a single propeller 22 at the front of the frame 12 and a single propeller 22 at the rear of the frame 12 is used in the same manner.

In another example each propeller 22 is driven by its own hydraulic motor 36, through a bearing housing/load adaptor 40. Hydraulic flow and pressure is provided from a hydraulic pump 42 that is directly coupled to an engine 18. With four propellers 22 positioned on the frame 12, the two propellers 22 in the front are coupled together while the two propellers 22 at the rear are coupled together and are adjustably positioned to direct flow in a horizontal plane or in a downward vertical plane. To reduce or eliminate tangling of debris from a rope, plant matter or the like a shaft protector 44 is used which permits the shaft to continue to rotate even if debris is caught on the protector 44. Ragless propellers 22 may also be used to push debris away from the propellers 22 to reduce the chance of debris becoming entangled in the propeller 22.

In addition to the propellers 22, a conduit outlet or nozzle 46 is located on the frame 12 such that when the vehicle is deployed to a lagoon, the nozzle 46 may be positioned above or below the surface of the lagoon. The nozzles 46 are connected to the one or more pumps 20. The one or more pumps 20 may be connected to the nozzles 46 either in parallel, in series, or in some other combination. Each nozzle 46 has a thrust vector that is adjustable either individually or in groups in any direction including generally vertical, horizontal, side-to-side, and/or forward to back or some combination of vertical and horizontal. The thrust vectors may also be adjusted through use of deflector devices 29. The thrust vectors of the nozzles 46 may be adjusted in real time, continuously or on an intermittent basis in order to provide different types of agitation, propulsion or both.

In one example the nozzles 46 are attached to the frame 12 with a joint 30 and an actuator 32. The joint 30 provides many degrees of freedom for the movement of the nozzles 46 and the actuator 32 moves the nozzles 46 to change their thrust vectors. In addition to providing agitation, the nozzles 46 may be used to provide propulsion for the vehicle 10 when the vehicle is floating in a lagoon by changing both the thrust of the nozzle 46 and/or changing the thrust vectors of the nozzle 46. Preferably the propellers 22 and nozzles 46 are separately powered which provides for fine control of the propulsion and allows the frame to be easily held steady in a desired location.

The operation of the nozzles 46 are controlled by one or more control units 38 that send or relay instructions to the motors or pumps regarding the thrust of the nozzles 46. The control unit 38 also controls the adjustment of the thrust vectors of the nozzles 46 through the actuator 32. The operation of each nozzle 46 is controlled individually or as part of a group of some or all of the nozzles 46. Further, each characteristic of the operation of each nozzle 46 is controlled individually or as part of a group of some or all of the nozzles 46. The one or more control units 38 also sends or relays instructions regarding the operation of the other components of the vehicle such as the drive motors, pumps, nozzles, actuators, deflector plates, rudders and the like.

In addition to, or instead of, the nozzles 46, a conduit 50 having an outlet port 52 that is connected to the pump 20 is used. The conduit 50 may include a fitting 54 for the connection of an additional conduit 50 in order to move fluid from the vehicle 10 to another device on shore. The conduit has a fixed or aimable position and is used with a diffuser, flow conditioner, deflector device or the like positioned near or adjacent to the outlet port 52 to increase the velocity of the stream, the direction of the stream, and/or affects the flow pattern of liquid moved by the liquid exiting the conduit 50. The outlet ports 52 of the conduits 50 are positioned above or below the surface of the lagoon to provide a desired agitation effect above or below the surface of the lagoon. While not required, eductors, diffusers, or the like are located near or adjacent the outlet ports 52. In one example an outlet port 52 is positioned at the lagoon surface and a deflector plate 29 is positioned below the lagoon surface. In addition to providing agitation within the lagoon, the conduits 50 are also utilized to supply liquid to the banks of the lagoon in order to break up the banks or wash the banks.

In addition to, or alternatively to, propellers 22, nozzles 46, and/or conduits 50, other devices may be used to provide or assist with agitation. As examples augers, spinning blades, scrapers, a loader bucket, or the like may be used to draw in solids or liquids from the lagoon toward the vehicle 10 to provide material to be agitated by the vehicle 10. The other devices would be fixed or adjustably connected to the frame 12. For example a scraper is connected to an extendable arm 33 and is used to pull solids from the surface of the lagoon or the banks toward the agitation devices of the vehicle 10. Also, connected to the frame 12 could be a tail flail or flail mower type 57. The tail flail is used to clean banks or could be submerged to break up solids from the bottom of the lagoon.

Mounted to the vehicle 10 are one or more sensors 56 that provide information to the control unit 38 in part to provide alerts and warnings. The sensors 56 monitor the operation of the vehicle 10 as a whole, the individual components of the vehicle 10, ambient conditions, the position and movement of the vehicle 10 and/or provide information about the operating location of the vehicle 10. The sensors 56 operate in any manner such as through use of frequency of electromagnetic energy including infrared, visible, and ultraviolet light such as lidar or radar, as well as acoustic energy such as sonar. Particular types of sensors 56 and information include lidar, radar, sonar, optical, bottom density, topographic mapping, position (like GPS), proximity, object avoidance, orientation, heading, incline, accelerometers, vibrometers, and velocity sensors. In one example, the sensors 56 are used to detect solids content (N, P, and K values), temperature and density of liquid and provide information to the control unit 38 in order to track and record the agitation levels of a lagoon. Once the agitation levels start to even/level out an assessment is made as to whether the lagoon is well-agitated and the engine and propeller speeds are controlled/reduced so that the vehicle 10 runs more efficiently as solids need only be ins suspension instead of trying to lift solids from the bottom of the lagoon.

The vehicle 10 and/or the component parts are controlled and operated partially or fully autonomously and/or remotely by a human operator. Autonomous operations, which are controlled by the control unit 38, in addition to those already described, include an anchor mode, programmable routing through the lagoon, object avoidance, bounded operational areas and the like. Remote operation includes the control and operation of the machine and/or components both when the vehicle is on the ground, within the lagoon, or both, through use of a remote control system 58. The remote control system 58 includes wireline or wireless communications that transmit and receive data to and from the vehicle. In addition, the remote control system includes a personal electronic device such as tablet, laptop, or the like. All functions of the vehicle and its component parts are remotely controlled including gross functions such as propulsion on land or in the lagoon, agitation, steering and the like as well as control of the various components to accomplish the gross functions of the vehicle 10. These include the propellers, pumps, actuators, wheels, power sources, sensors and the like. For example, the speed of rotation of the propellers, and the thrust vectors of the propellers can be controlled remotely as well as other operating characteristics of the propellers.

In another example, the vehicle 10 is controlled autonomously based upon the depth of the lagoon and/or the bottom density. Using the sensors 56 the bottom surface of the lagoon is scanned and mapped by the control unit 38 using lidar, sonar, radar or the like that is connected either electrically or wirelessly. Based upon this information the control unit 38 directs the vehicle to high spots or mounds of solids and spends more time agitating at the high spots as compared to the low spots. In a similar manner, the vehicle 10 would be directed to spend more time in areas where there was more lower density material at the bottom of the lagoon as compared to the actual lagoon bottom where typically there is a higher-density of clay material.

In yet another example, using sensors 56 such as lidar, sonar, radar, multiple cameras (infrared and visible light) and the like the control unit autonomously controls the vehicle 10 to avoid objects as well as determines where the banks of the lagoon are located to avoid the banks. Object avoidance would be for both above and below the liquid surface.

Accordingly, an amphibious vehicle has been disclosed that has few moving parts that need to be maintained since the propulsion and agitation is achieved simply by rotating the multiple propellers at different rates and positions to create thrust vectors in different directions to move the vehicle. Articulating nozzles are not needed, nor is high-pressure and sand-laden liquid moving through pipes which cause wear and a water hammer effect when a gate valve shuts. Also, no gearboxes are needed to transfer energy to a centrifugal pump. Instead, sand-laden liquid passes by the propeller and is moved downward or outward for mixing rather than flowing though piping, which over time, wears on everything. To maintain the vehicle the propeller only needs to be un-bolted and replaced. When propellers are used, greater fluid movement is achieved as compared to high velocity nozzles from a single submerged centrifugal pump.

The disclosed vehicle uses fewer mechanical and electrical components which means less maintenance and fewer parts that could fail and cause down time. With submerged propellers, the vehicle will not have plugging problems caused by centrifugal pumps and nozzles that require priming where there is a risk of losing the prime in certain scenarios. The disclosed vehicle creates greater flow and disturbance of a greater volume of liquid which is important when suspending solids in manure lagoons that contain millions of gallons.

Additional benefits of the disclosed vehicle include satisfaction of a user's need for low maintenance and wear over time, the ability to drive the vehicle up the steep and slippery banks of recently emptied manure lagoons, and access to a simplified system that is reliable to use. Breakdowns are costly and when they happen the equipment is typically in the middle of a manure lagoon where the vehicle is dangerous to reach. The vehicle also satisfies user needs that include the expectation that the mixing and agitation ability will perform well as it is important to agitate and mix all the nutrients and solids that settle to the bottom of deep pits and the vehicle needs to move fluid at velocities high enough to keep them suspended while other equipment pumps the material out of the lagoon to the field. The objective is to apply a consistent nutrient content to the field throughout the entire process of pumping liquid from the lagoon. If not mixed properly, there will be nutrient deficient water pumped out at the beginning from the top of the lagoon and toward the end and bottom of the lagoon there will be a mixture too rich in nutrients with high solids, or becomes too thick to pump to the field.

From the above discussion and accompanying figures and claims it will be appreciated that the vehicle 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A method of agitating liquid manure in a liquid manure lagoon, the method comprising:
   identifying a route in a bounded operational area of the liquid manure lagoon within which an amphibious vehicle uses a liquid manure agitation device mounted on the amphibious vehicle to agitate the liquid manure in the liquid manure lagoon; and
   autonomously operating the amphibious vehicle to travel along the route in the bounded operational area of the liquid manure lagoon while the liquid manure agitation device agitates the liquid manure in the liquid manure lagoon using a propeller having a thrust vector that is configured to be directed vertically upward toward a surface of the liquid manure lagoon to cause agitation at the surface.

2. The method of claim 1, further comprising using one or more sensors to identify the route in the liquid manure lagoon.

3. The method of claim 2, wherein the one or more sensors include: lidar, radar, sonar, optical, bottom density, topographic mapping, position, proximity, object avoidance, orientation, heading, incline, accelerometers, vibrometers, and velocity.

4. The method of claim 2, further comprising detecting solids content, temperature and density of the liquid manure using the one or more sensors.

5. The method of claim 1, further comprising operating the amphibious vehicle fully autonomously in the liquid manure lagoon.

6. The method of claim 1, further comprising setting a boundary perimeter of the liquid manure lagoon.

7. The method of claim 1, further comprising programming the route in the liquid manure lagoon.

8. The method of claim 1, further comprising avoiding objects in the liquid manure lagoon.

9. The method of claim 1, further comprising:
   scanning a bottom surface of the liquid manure lagoon; and
   autonomously directing the amphibious vehicle to areas based upon the scanning.

10. The method of claim 9, wherein the areas include mounds of solids within the liquid manure lagoon.

11. The method of claim 1, wherein the amphibious vehicle further includes multiple autonomous modes.

12. The method of claim 11, wherein the multiple autonomous modes further include:
    an anchor mode; and
    an object avoidance mode.

* * * * *